United States Patent [19]

Kurusu et al.

[11] Patent Number: 5,693,992
[45] Date of Patent: Dec. 2, 1997

[54] COOLING FAN STRUCTURE FOR AC GENERATOR

[75] Inventors: Kyoko Kurusu; Katsumi Adachi, both of Himeji, Japan

[73] Assignee: Mitsubishi Denki Kabushiki Kaisha, Tokyo, Japan

[21] Appl. No.: 359,649

[22] Filed: Dec. 20, 1994

[30] Foreign Application Priority Data

Dec. 28, 1993 [JP] Japan ............... 5-336998

[51] Int. Cl.⁶ .................. H02K 9/06; H02K 1/22
[52] U.S. Cl. .................. 310/63; 310/263; 416/178
[58] Field of Search .................. 310/62, 63, 263; 416/178, 186 R

[56] References Cited

U.S. PATENT DOCUMENTS

| | | | |
|---|---|---|---|
| 1,432,903 | 10/1922 | Reddig | 290/1 R |
| 3,263,963 | 8/1966 | Hanschke et al. | 416/186 R |
| 3,694,881 | 10/1972 | Glucksman | 416/178 |
| 3,782,853 | 1/1974 | Frister | 416/186 R |
| 3,856,434 | 12/1974 | Hoffmann | 416/186 R |
| 4,399,379 | 8/1983 | Marks et al. | 310/62 |
| 4,488,070 | 12/1984 | Iwaki et al. | 310/62 |
| 4,588,911 | 5/1986 | Gold | 310/62 |
| 4,838,762 | 6/1989 | Savage et al. | 416/178 |
| 4,879,483 | 11/1989 | Barahia | 310/63 |
| 5,241,230 | 8/1993 | Tanaka et al. | 310/62 |

FOREIGN PATENT DOCUMENTS

| | | | |
|---|---|---|---|
| 1309366 | 12/1962 | France | 416/186 R |
| 2 500 966 | 1/1981 | France | |
| 323848 | 8/1920 | Germany | 416/186 R |
| 344746 | 11/1921 | Germany | 416/178 |
| 803551 | 4/1951 | Germany | 416/186 R |
| 3514207 | 4/1985 | Germany | |
| 334456 | 12/1928 | United Kingdom | |

*Primary Examiner*—Clayton E. Laballe
*Attorney, Agent, or Firm*—Sughrue, Mion, Zinn, Macpeak & Seas, PLLC

[57] ABSTRACT

A cooling fan for an AC generator of a motor vehicle implemented in light weight and having a high cooling capability with generation of noise being suppressed to a minimum. The cooling fan is composed of a metallic base plate, blade members of a synthetic resin material fitted on elongated core members each having a small width and formed by bending projecting portions of the base plate and a fan guide fixedly secured to the core members at top end thereof by welding.

5 Claims, 10 Drawing Sheets

COOLING FAN STRUCTURE FOR AC GENERATOR

BACKGROUND OF THE INVENTION

1. Field of the Invention

The present invention relates to a structure of a cooling fan for an alternating current generator (hereinafter also referred to as the AC generator), which fan is rotated together with a rotatable shaft of the AC generator for carrying away heat generated therein by air flow produced by the fan. The AC generator equipped with the cooling fan according to the invention can be implemented in a small size and profitably find application to motor vehicles or automobiles.

2. Description of the Related Art

In the industrial field of the motor vehicles or cars, there arises in recent years a trend for reducing the space to be allocated to an engine room in an effort to increase correspondingly the room for a driver and passenger(s) so that they can feel comfortableness in riding in the car. As a result of this, the internal combustion engine as well as accessaries thereof and many other parts have to be installed within the engine room in congestion with a high density. To this end, there also exists a demand for miniaturization of the AC generator for the motor vehicle. On the other hand, with a view to ensuring high safety for maneuvering as well as availability of intelligent facilities, electronic controls for the devices accommodated within the engine room are increasingly adopted, being accompanied with increase in the electric power consumption. Under the circumstances, high temperature tends to prevail within the engine room, which is of course undesirable. For coping with this problem, the AC generator is also required to be improved in respect to the cooling structure.

As the cooling means for the AC generator for the motor vehicle, there is generally adopted a forcive air cooling structure in which the air is forcively circulated through the AG generator by a cooling fan which is rotated together with a shaft of the AC generator.

For having better understanding of the background of the invention, description will first be directed to an air-cooling type AC generator for the motor vehicle known heretofore.

FIG. 11 is a sectional view of a conventional air-cooling type AC generator which is mounted in association with an internal combustion engine of a motor vehicle in such disposition that the right-hand side of the AC generator is positioned at the front side of the engine (not shown).

Referring to the figure, a rotatable shaft 1 of the AC generator is rotatably supported by bearings mounted at center portions of front and rear brackets 3 and 4 which are fittingly secured to a stator core 2 of the AC generator. A pulley 5 is mounted fixedly on the rotatable shaft 1 at a front end portion thereof, wherein engine torque is transmitted to the shaft 1 of the AC generator via a transmission belt (not shown) extending around the pulley 5. Secured to the rotatable shaft 1 is a magnetic core assembly 6 having a plurality of pole shoes which are disposed circumferentially around the magnetic core assembly 6.

As can be seen in the figure, cooling fans 100 are fixedly secured to front and rear end faces, respectively, of the magnetic core assembly 6. Thus, when the magnetic core assembly 6 rotates together with the shaft 1, the cooling fans 100 are caused to rotate as an integral unit with the magnetic core assembly 6, whereby the ambient air is taken in through an intake port 7 under the air-drawing action of the rotating fans 100 and caused to flow circulatively through the interior of the AC generator while cooling heat generating portions thereof to be finally discharged through a discharge port 9.

Heretofore, the cooling fan for the AC generator of the motor vehicle is implemented in such a structure as shown in FIGS. 9 and 10, in which FIG. 9 shows the same in a perspective view and FIG. 10 is a top plan view thereof.

Referring to the figure, the illustrated cooling fan 100 is comprised of a base plate 101 at which the cooling fan 100 is mounted to the magnetic core assembly 6 (FIG. 11) of the AC generator, a plurality of projecting fan blades 102 formed in a row in the base plate 101 along the outer periphery thereof and a ring-like metallic fan guide member 103 secured to free ends of the fan blades 102 by welding.

The fan blades 102 are formed integrally with the base plate 101. More specifically, the base plate 101 and the fan blades 102 are integrally formed of a sheet metal by a blanking press, whereupon the fan blades 102 are bent orthogonally to the plane of the base plate 101 in such orientation that they extend obliquely relative to the diametrical direction of the base plate 101. In other words, the plural fan blades 102 are formed in the form of a circumferential row along the outer peripheral edge of the base plate 101 by blanking a single sheet metal.

Thus, in the cooling fan 100 of the AC generator for the motor vehicle which is formed of a sheet metal integrally with the base plate 101 through the blanking process, each of the fan blades 102 will usually present a rectangular shape in cross section. Due to such rectilinear configuration of the fan blades 102, turbulence takes place in the air flow brought about by the fan blades 102 in the course of rotation of the cooling fan 100, giving rise to generation of harsh noise to a problem.

At this juncture, it should however be mentioned that the width W, the area of each of the fan blades 102 and the number thereof are to be so determined that the air flow through an air-gap 8 of the AC generator can be smoothened and that a sufficient amount of air flow for carrying away heat generated within the AC generator can be realized. To this end, the base plate 101 will have to be so formed by the blanking press as to have a large diameter. However, the area of the magnetic core assembly 6 available for mounting the cooling fan 100 can not be varied arbitrarily but remains constant, which in turn means that the diameter of the base plate 101 can not be increased as desired. To say in another way, restriction is necessarily imposed on determination of the width W and the area of the fan blades 102 as well as the number thereof. Such being the circumstances, in the cooling fan 100 known heretofore in which the fan blades 102 are formed integrally with the base plate 101 and bent orthogonally to the plane thereof, it has been required to reduce or decrease one of the width W, the area of each of the fan blades 102 and the number thereof, suffering from a problem that a sufficient amount of air flow can not be assured, degrading the cooling capability of the cooling fan 100.

Besides, it should be mentioned in conjunction with the cooling fan 100 known heretofore that it is heavy in weight because of formation of the base plate 101, the fan blades 102 and the metallic fan guide member 103 all of a metal material, presenting a problem that a significant power consumption is involved for rotating the cooling fan 100, to a further disadvantage.

SUMMARY OF THE INVENTION

In the light of the state of the art described above, it is an object of the present invention to provide an improved structure of a cooling fan for an AC generator of a motor vehicle, which fan can be implemented in a light weight structure in such a configuration which can ensure an enhanced or high cooling capability and rotation with noise generation suppressed to a minimum.

In view of the above and other objects which will become apparent as description proceeds, there is provided according to an aspect of the present invention a cooling fan for an AC generator which includes a base plate mounted on a rotatable shaft of an AC generator so as to rotate together with the shaft, and a plurality of fan blades provided along an outer periphery of the base plate and projecting therefrom, wherein each of the fan blades has a streamline shape in cross section.

With the structure of the cooling fan described above, the fan can be driven smoothly with noise generation being suppressed to a minimum.

In a preferred mode for carrying out the invention, each of the above-mentioned fan blades may be constituted by a blade member which is formed of a synthetic resin material.

By forming the blade member of a synthetic resin material, the fan blade and hence the fan as a whole can be implemented in a light weight structure, whereby the power consumption required for driving the fan can be decreased.

In another preferred mode for practicing the invention, elongated core members projecting radially outwardly may be formed along an outer periphery of the base plate at positions where the blade members are to be mounted, wherein each of the blade members is formed with a through-hole formed, and the blade member is fixedly mounted on the core member by inserting the core member into the through-hole.

Owing to the arrangement mentioned above, the cooling fan can be manufactured inexpensively in a rigid structure through a simple manufacturing process.

In yet another mode preferred for carrying out the invention, a first engaging portion may be formed at one end surface of each of the plural blade members, while a second engaging portion is formed in a guide member provided separately from the blade members, wherein the second engaging portion is brought into engagement with the first engaging portion to thereby fixedly secure the guide member to the core members projecting from the base plate.

By virtue of the arrangement described above, the guide member can easily be secured on the top ends of the fan blades, whereby rigidness of the fan structure can further be reinforced.

In a further preferred mode for practicing the invention, the guide member and the blade member may be formed of a synthetic resin in an integral structure. In that case, the cooling fan can be implemented in a rigid structure of light weight, whereby power consumption involved in rotating the fan can further be reduced.

The invention is also directed to an AC generator quipped with the cooling fan of the structure mentioned above.

Thus, according to another aspect of the invention, there is provided an AC generator for a motor vehicle which includes an input shaft operatively coupled to an output shaft of an internal combustion engine to be driven by the engine, and a cooling fan assembly mounted within the AC generator for carrying away heat generated therein by producing air flow circulated through the AC generator, wherein the cooling fan assembly includes a base plate mounted on the input shaft of the AC generator so as to rotate together with the shaft, and a plurality of fan blades formed along an outer periphery of the base plate and projecting therefrom, and wherein each of the fan blades includes a blade member which is formed of a synthetic resin material and which has a streamline shape in cross section.

Furthermore, the invention is also concerned with a motor vehicle equipped with the AC generator of the above-mentioned structure.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

FIG. 11 is a sectional view of a conventional air-cooling type AC generator which is installed in association with an internal combustion engine in an engine room of a motor vehicle in.

DESCRIPTION OF THE PREFERRED EMBODIMENTS

Figure 1:
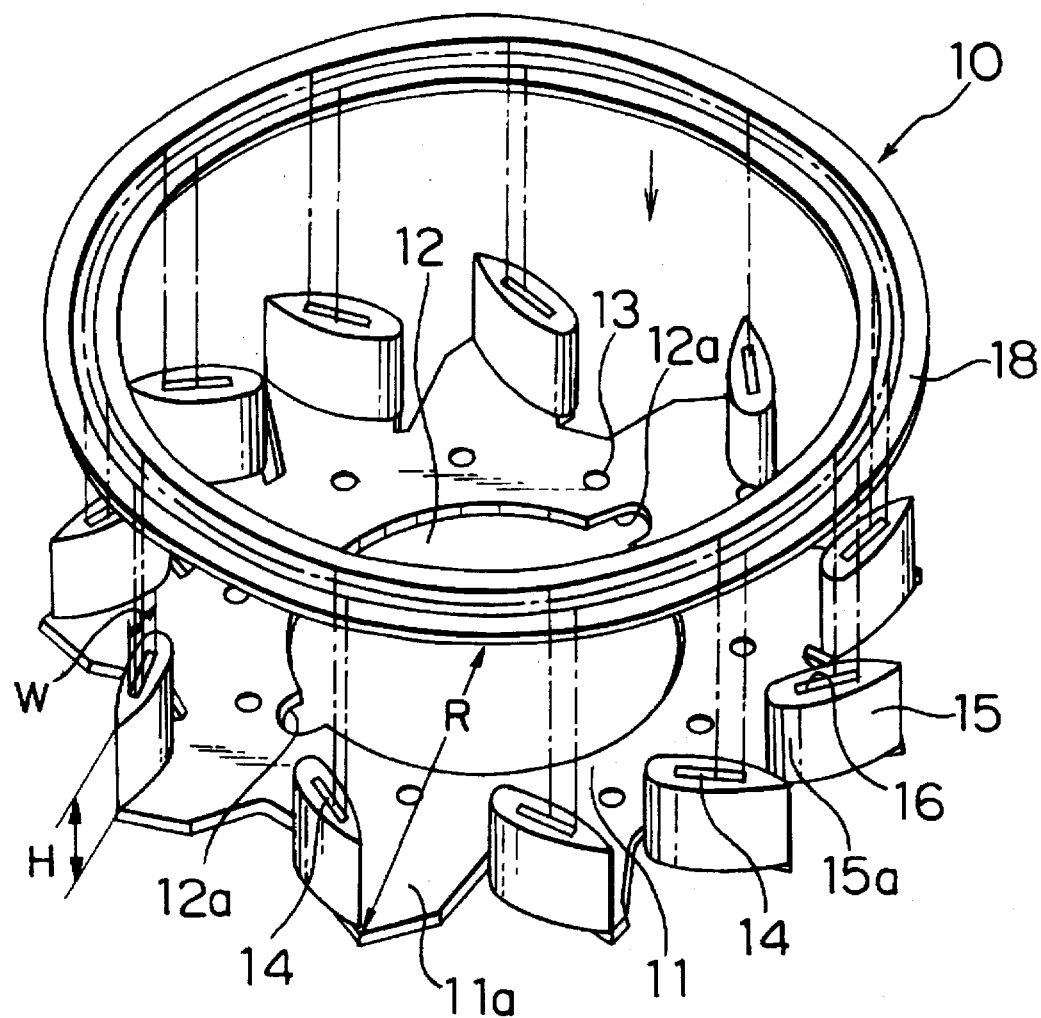
FIG. 1 is an exploded perspective view showing a structure of a cooling fan for an AC generator for a motor vehicle according to a first embodiment of the present invention.

Now, the present invention will be described in detail in conjunction with preferred or exemplary embodiments thereof by reference to the drawings. In the following description, like reference characters designate like or corresponding parts throughout the several views. Also in the following description, it is to be understood that such terms as "front", "rear", "left", "right", "top", "bottom", "upwardly", "downwardly" and the like are words of convenience and are not to be construed as limiting terms.

Embodiment 1

Figure 2:
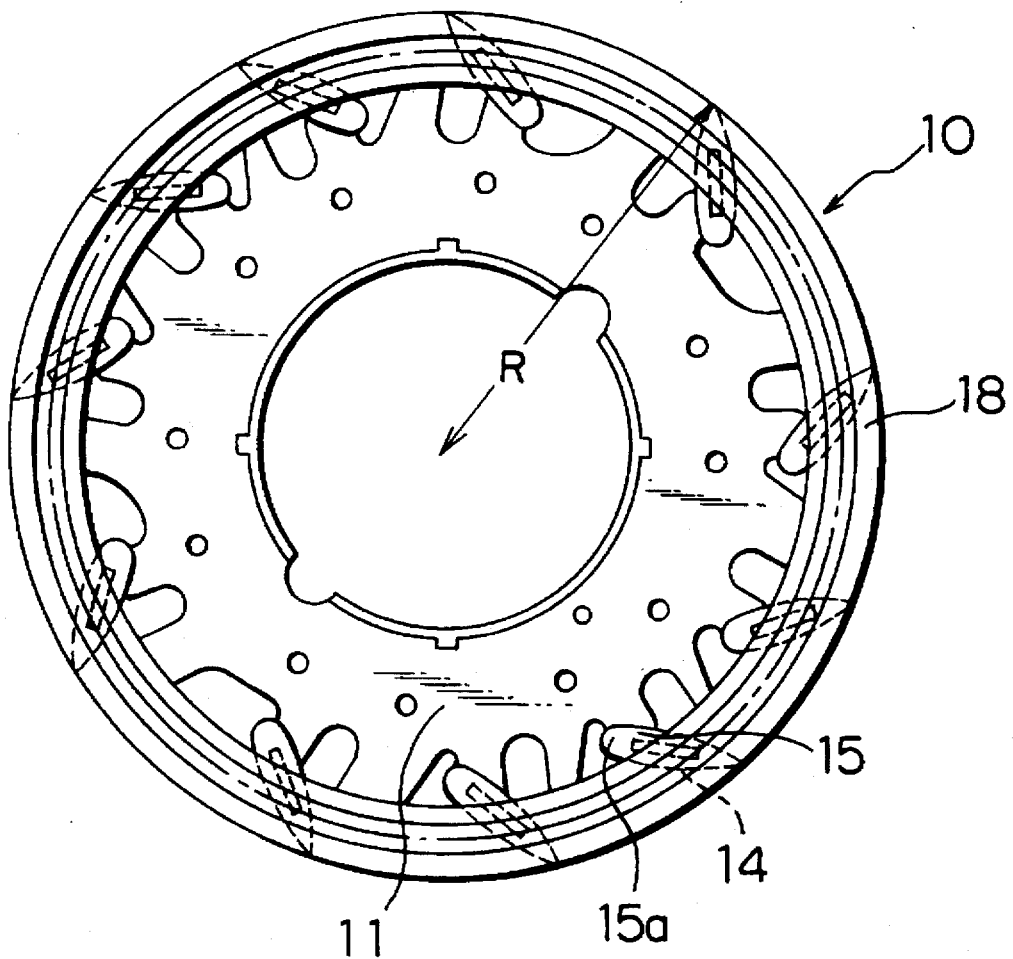
FIG. 2 is a top plan view of the same.

FIG. 1 is an exploded perspective view showing a structure of a cooling fan for an AC generator for a motor vehicle according to a first embodiment of the present invention, and FIG. 2 is a top plan view of the same.

Referring to the figures, the cooling fan generally denoted by a reference numeral 10 is comprised of a base plate 11 at which the cooling fan 10 is secured to the AC generator in the manner mentioned previously, fingers or core members 14 formed integrally with the base plate 11, blade members 15 fitted onto the core members 14, respectively, and a fan guide member 18 mounted on the blade members 15 at the top ends thereof.

Figure 11:
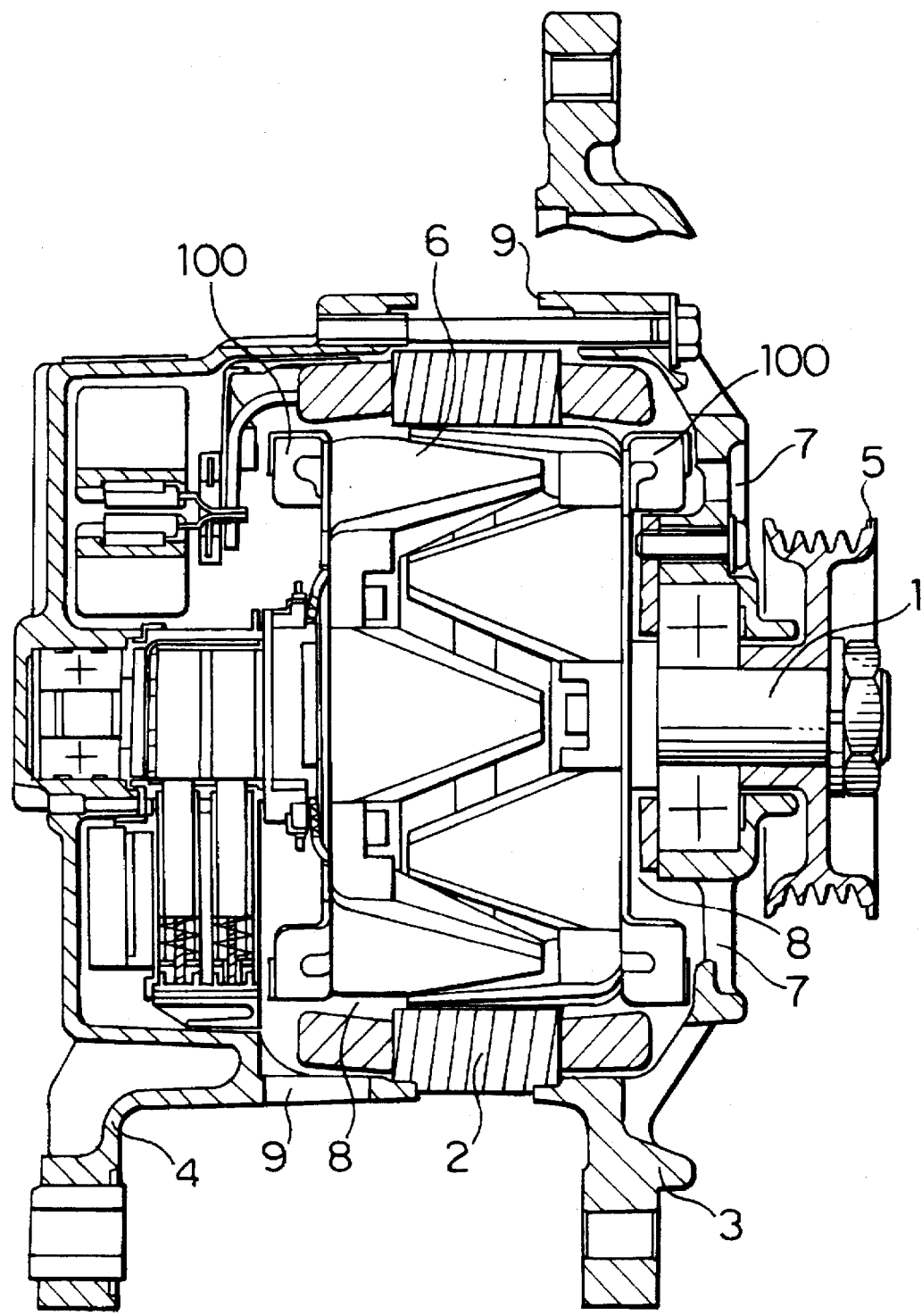

The base plate 11 is formed of a sheet metal by press cutting of blanking or the like process and has a radius R which is selected substantially equal to that of the magnetic core assembly 6 of the AC generator described hereinbefore by reference to FIG. 11. The base plate 11 is coaxially formed with a circular aperture 12 of a relatively large diameter. Upon mounting of the cooling fan on the AC generator, the rotatable shaft 1 thereof is inserted through the circular aperture 12. In order to prevent the base plate 11 from angular displacement relative to the AC generator, the circular aperture 12 is formed with a pair of stop notches 12a which are disposed diametrically in opposition to each other and adapted to receive therein stopper projections (not shown) each of a cross-section complementary to the that of the notch 12a. A plurality of through-holes 13 are formed in the base plate 11 around the circular aperture 12.

Further, radial projections 11a each of a polygonal shape are formed integrally with the base plate 11 along the outer periphery thereof. The finger-like core members 14 mentioned previously are formed at the tip end portions of the projections 11a, respectively. Each of the core members 14 is formed by bending a rectangular finger-like portion projecting from the projection 11a at a substantially right angle relative to the plane of the projection 11a. On the other hand, the rectangular finger-like portion is so formed as to extend radially outwardly at a predetermined angle relative to the radial direction of the projection 11a. Furthermore, the width W of the core member 14 is selectively determined in dependence on the number of the blade members 15 to be provided. More specifically, when a large number of the blade members 15 are to be provided, the width W of the core member 14 is selected correspondingly narrow so that the blade members 15 can be fitted onto the core members 14, respectively, without interference among the blade members 15.

Each of the blade members 15 fitted onto each of the core members 14 is formed of a synthetic resin of light weight and has a cross-section of a streamline shape.

Furthermore, the height H of the blade member 15 is selected to be approximately equal to that of the core member 14, while the vertical sectional area of the blade member 15 is so selected that a sufficient amount of air flow can be produced upon rotation of the cooling fan 10.

Figure 3:
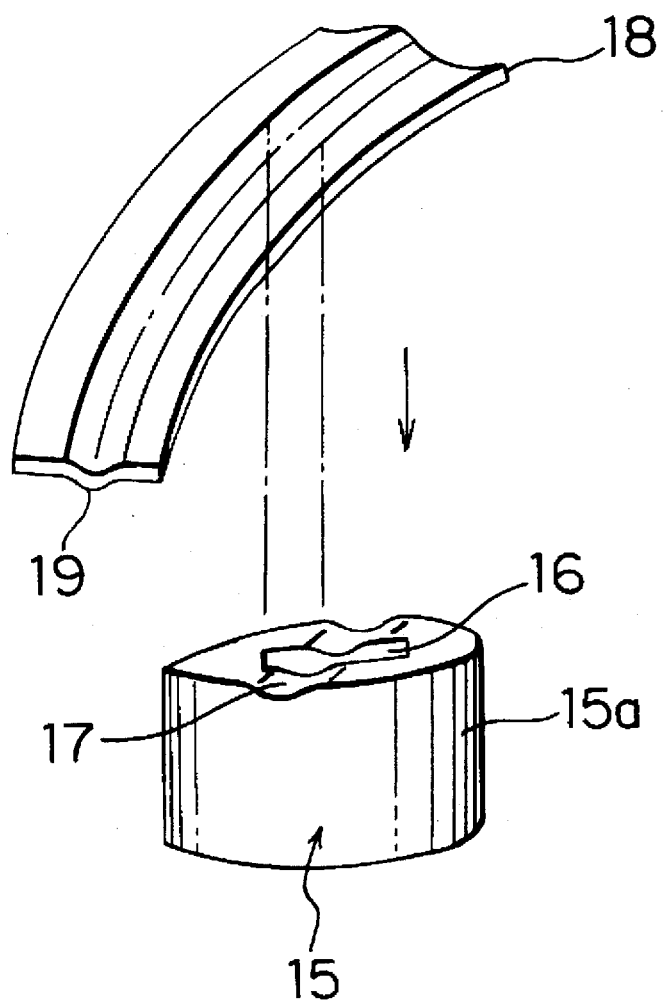
FIG. 3 is a perspective view for illustrating a positioning of a fan guide member to blade members.

Formed in each of the blade members 15 at the center portion thereof is a through-hole 16 of a cross-section in a shape which is complementary to that of the core member 14 so that the core member 14 can snugly be inserted into the through-hole 16. Additionally, a positioning recess 17 serving as a first engaging portion is formed in the core member 14 at a top surface thereof, as shown in FIG. 3. The blade member 15 of the structure mentioned above is mounted on the core member 14 by inserting the latter into the through-hole 16 in such orientation that a head portion 15a of the blade member 15 of the streamline shape is positioned radially inwardly.

The fan guide member 18 is mounted atop on the plurality of blade members 15 fitted in the manner described above. The fan guide member 18 is constituted by a ring of a metallic material and has a radius selected relative to the radius R of the base plate 11 so that the fan guide member 18 can be disposed on the plurality of blade members 15 which are disposed in a circular array. Further, there is formed in the fan guide member 18 at a center portion thereof a positioning protrusion 19 having a cross-sectional shape which is complementary to that of the positioning recesses 17 of the blade members 15, as shown in FIG. 3. Thus, by fitting the positioning protrusion 19 into the positioning recesses 17 of the blade members 15, the fan guide member 18 can be disposed on the plurality of blade members 15 in a coaxial alignment with the base plate 11. In this state, the fan guide member 18 is fixedly secured to the core members 14 by a projection welding, whereby rigid connection between the fan guide member 18 and the core members 14 can be realized.

Next, description will turn to assembling and operation of the cooling fan 10.

Starting from the state in which the fan guide member 18 is disposed to face the front bracket 3, the rotatable shaft 1 is inserted through the circular aperture 12 of the base plate 11, whereupon the base plate 11 is secured to the magnetic core assembly 6 by means of screws (not shown) inserted through the holes 13. The cooling fan 10 according to the instant embodiment of the invention can thus be fixedly mounted on the AC generator.

When the engine (not shown) is driven in this state, the shaft 1 is rotated via a belt and the pulley 5, whereby the cooling fan 10 is caused to rotate together with the magnetic core assembly 6.

Rotation of the cooling fan 10 is sustained by the output power of the engine. In this conjunction, it is to be noted that because each of the fan blades of the cooling fan 10 is constituted by combination of the finger-like thin core member 14 and the blade member 15 of a synthetic resin light in weight, the fan blade can be implemented in a significantly lighter weight when compared with the large-size metallic fan blade 102 of the conventional cooling fan 100 described hereinbefore. Consequently, consumption of the engine power required for rotating the cooling fan 10 can correspondingly be decreased when compared with the cooling fan 100 known heretofore.

When the cooling fan 10 is rotated in the manner described above, the ambient air flows into the AC generator through the intake port 7 formed in the front bracket 3 to be thereby fed inwardly through the AC generator. Since the blade member 15 has the cross-section of streamline shape, the air fed inwardly can flow smoothly along the surfaces of the blade members 15 without producing any appreciable turbulence. As a result of this, generation of noise by the fan blades can be suppressed to a minimum. Besides, since the number of the fan blades can be increased by diminishing the width of the core members 14 with the vertical sectional area thereof being enlarged, a sufficiently large amount of air can be fed into and circulated through the AC generator for cooling heat generating portions thereof. The air is ultimately discharged from the discharge port 9.

As can now be understood, the cooling fan 10 for the AC generator according to the instant embodiment of the invention is advantageous in that consumption of the engine power for driving the cooling fan 10 can be decreased and at the same time smooth rotation of the cooling fan 10 can be realized without generating offensive noise while ensuring a sufficient amount of air flow.

In the foregoing, it has been described that the blade member 15 is formed independently and mounted subsequently on the core member 14. However, the invention is restricted to such an assembling process. It goes without saying that the blade member 15 may be formed in situ on the core member 14 through an insert molding process. Besides, although it has been mentioned that the positioning recess 17 is formed in the blade member 15 with the fan guide member 18 being provided with the positioning protrusion 19, it should be noted that the positioning recess 17 may be formed in the fan guide member 18 with the positioning protrusion 19 being formed integrally with the blade member 15 without departing from the scope of the invention.

Embodiment 2

Figure 4:
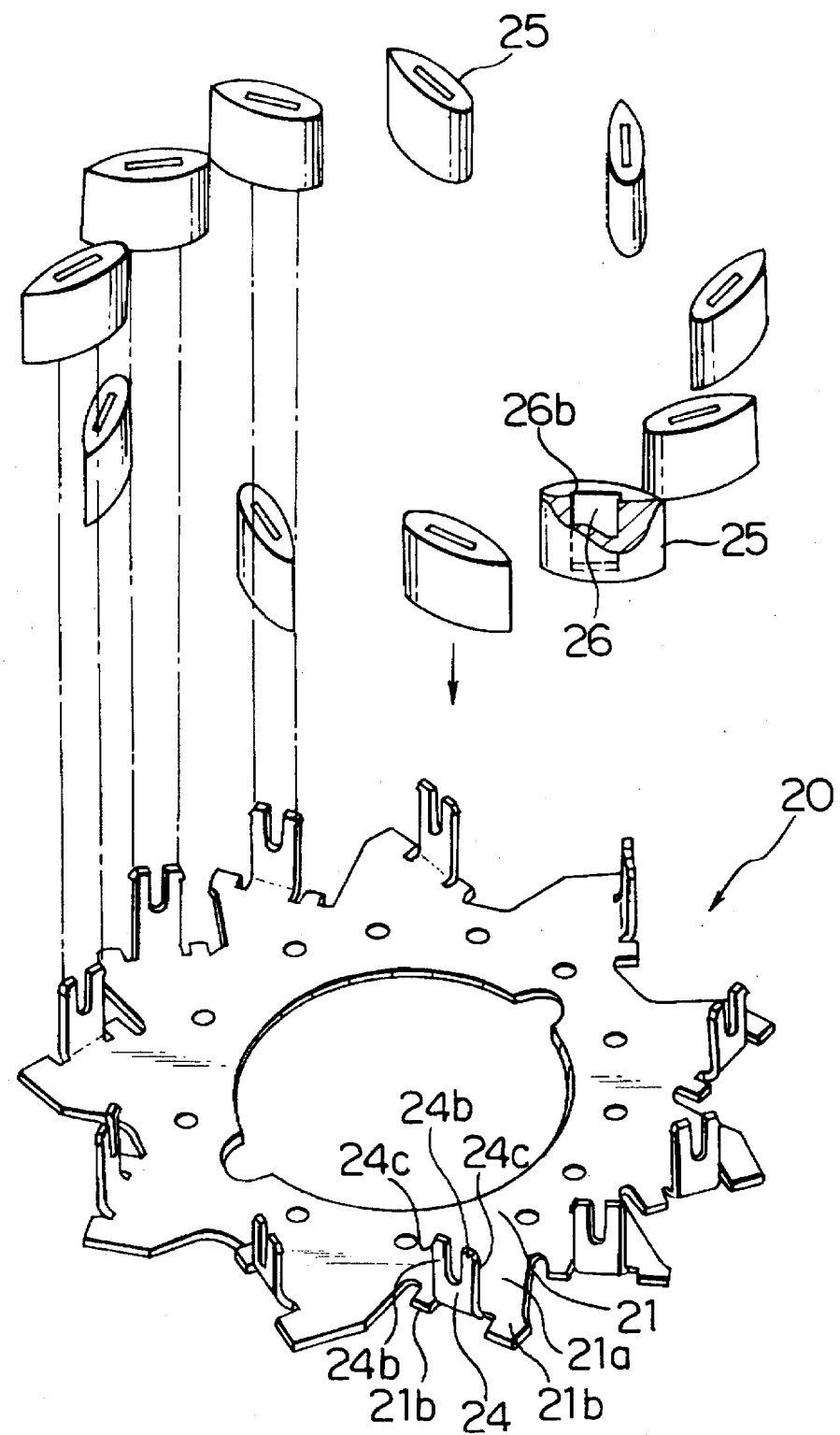
FIG. 4 is an exploded perspective view of a cooling fan for an AC generator of a motor vehicle according to a second embodiment of the invention.

Next, description will be made of the cooling fan for an AC generator according to a second embodiment of the invention. FIG. 4 is an exploded perspective view of the cooling fan for the AC generator of a motor vehicle. The cooling fan according to the instant embodiment of the invention differs from that of the first embodiment in that the fan guide is omitted and that a structure for preventing the blade member from slipping out is provided.

Referring to the figure, a cooling fan 20 is comprised of a base plate 21, a plurality of core members 24 formed integrally with the base plate 21 and a corresponding number of blade members 25 mounted on the core members 24, respectively.

The base plate 21 is provided with a plurality of projections 21a each having a pair of supporting portions 21b which project from the projection 21a at both sides, respectively, of the bent core member 24.

Figure 5:
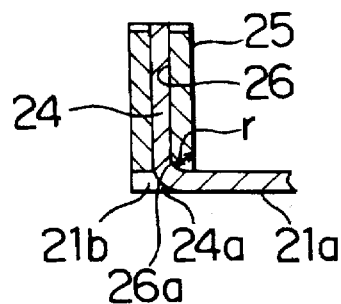
FIG. 5 is a sectional view for illustrating a structure in which a blade member is mounted onto a core member in the cooling fan shown in FIG. 4.

The core member 24 is formed by bending an elongated portion projecting from the projection 21a at a right angle relative to the plane of the projection 21a. In that case, the elongated portion is formed obliquely at a predetermined angle relative to the radial direction of the base plate 21, as in the case of the cooling fan of the first embodiment. It should however be noted that in the case of the instant embodiment, the core member 24 is bent with a predetermined curvature r relative to the plane of the projection 21a, as shown in FIG. 5. Further, the core member 24 has a pair of resilient legs 24b formed by partially cutting out a top portion of the core member 24, wherein each of the resilient legs 24b has a claw 24c projecting laterally outwardly, as is shown in FIG. 4.

On the other hand, the blade member 25 is formed of a synthetic resin material of light weight so as to have a cross section in a streamline shape, wherein a through-hole 26 of a cross section complementary to that of the core member 24 is formed at a center portion of the blade member 25, as in the case of the blade member 15 employed in the cooling fan according to the first embodiment of the invention. However, a bottom end portion of the blade member 25 of the cooling fan according to the instant embodiment is provided with a chamfered portion 26a with a curvature which is complementary to the curvature r mentioned previously, while retaining notches 26b adapted to engage with the claws 24c are formed in a top end portion of the inner wall of the through-hole 26, as can best be seen from FIG. 6.

Figure 6A:
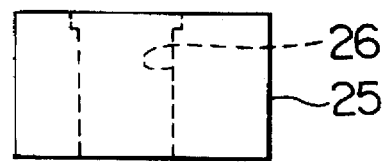
FIG. 6(A) to 6(C) are views for illustrating a process for mounting the blade member onto the core member.
Figure 6A:
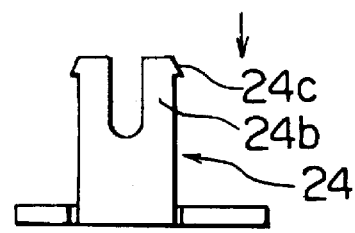
Figure 6B:
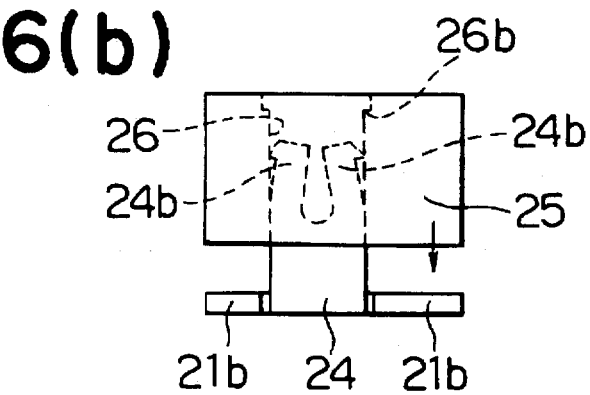
Figure 6C:
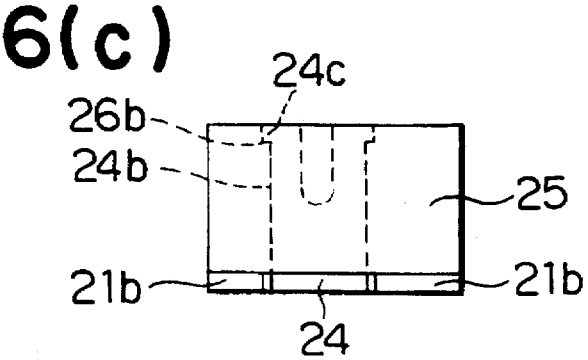

FIGS. 6(A) to 6(C) are views for illustrating a process for assembling the blade member 25 and the core member 14 to thereby constitute a fan blade. Referring to the figures, the blade member 25 is moved downwardly toward the core member 24 located just beneath the blade member 25 with the tip ends of the resilient legs 24b ahead, as shown in FIG. 6(A). When the bottom end portion of the through-hole 26 receives therein the kip end portion of the resilient legs 24b, the blade member 25 is pressed down onto the core member 24. The resilient legs 24b are then caused to resiliently bend inwardly in opposition to each other. Thus, the blade member 25 can forcively be moved downwardly until the bottom surface of the blade member 25 abuts on the top surfaces of the supporting portions 21b. See FIG. 6(B).

When the bottom surface of the blade member 25 bears against the top surfaces of the supporting portions 21b, the resilient legs 24b are resiliently restored to the position where the claws 24c engage with the retaining notches 26b formed in the top end portion of the through-hole 26. Thus, the blade member 25 is mounted on the core member 24 and locked against slipping out from the latter. Since the blade member 25 is supported by the supporting portions 21b in the state in which the chamfered portion 26a and the bent portion 24a formed with the same curvature closely contact with each other, the blade member 25 can be mounted on the core member 24 with enhanced stability.

As can be seen from the foregoing description, the cooling fan 10 according to the instant embodiment of the invention is constituted only by the base plate 21 and the fan blades without the ring-like member as with the case of the first embodiment, the weight of the cooling fan 10 can further be reduced with much simplified and inexpensive structure.

In other respects, the instant embodiment is essentially same as the first embodiment. Accordingly, any further description will be unnecessary.

Embodiment 3

Finally, description will be made of a cooling fan for the AC generator according to a third embodiment of the invention.

Figure 7:
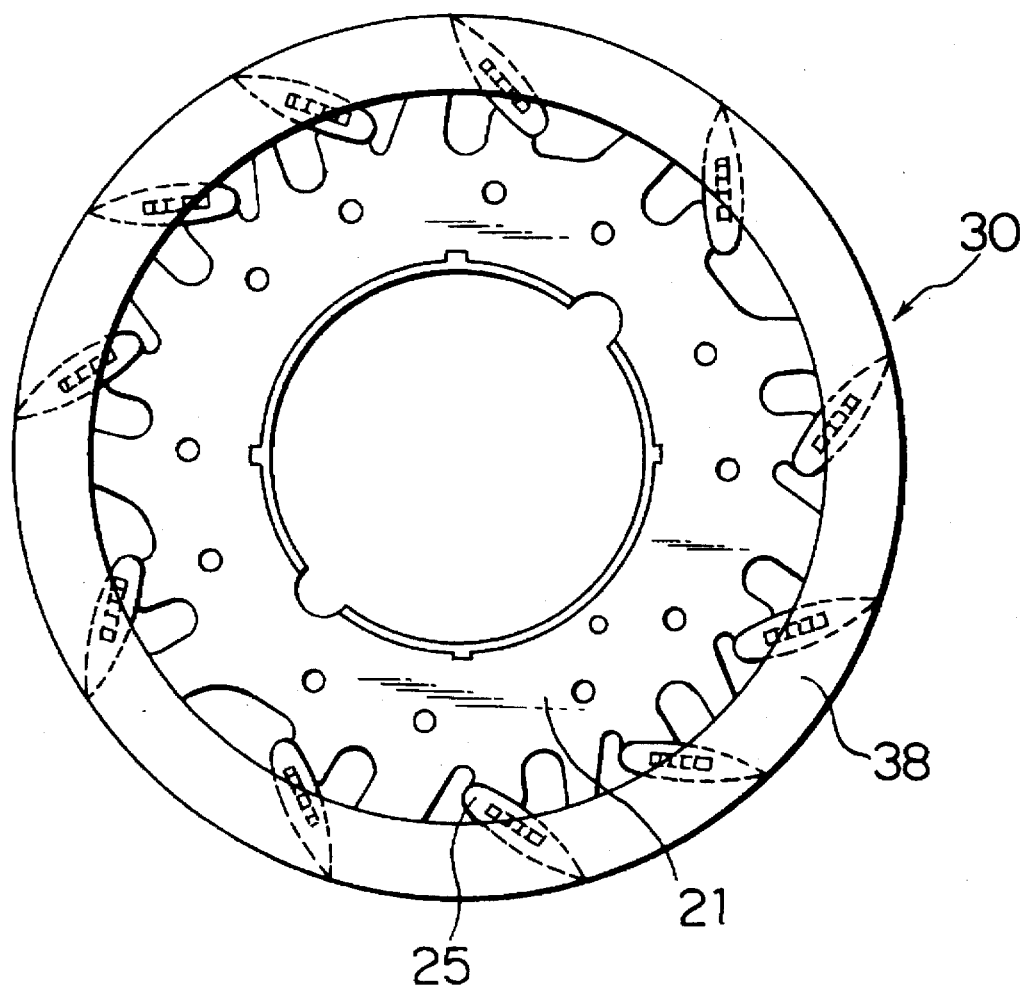
FIG. 7 is a top plan view of a cooling fan for an AC generator according to a third embodiment of the invention.
Figure 8:
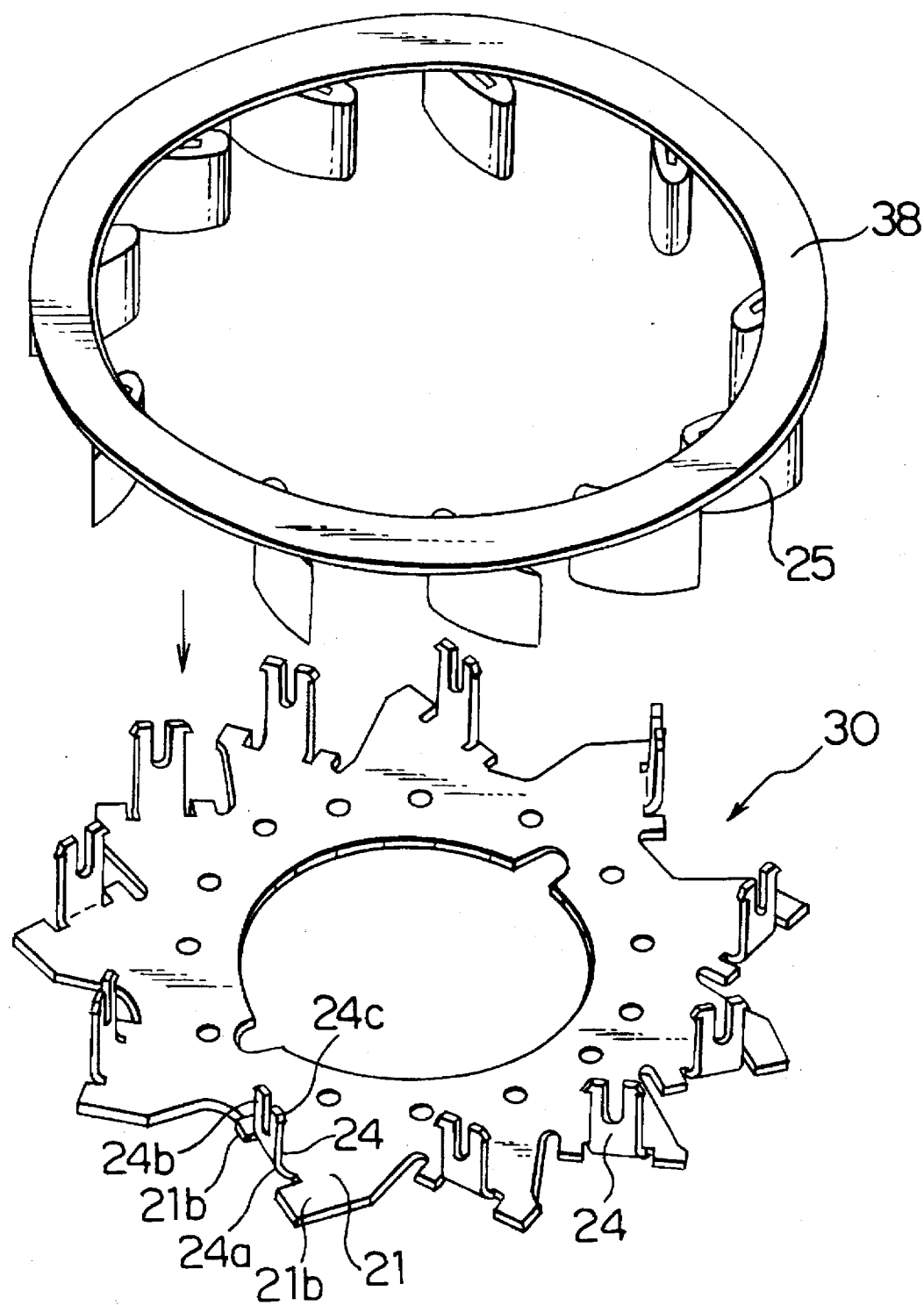
FIG. 8 is an exploded perspective view of the same.
Figure 9:
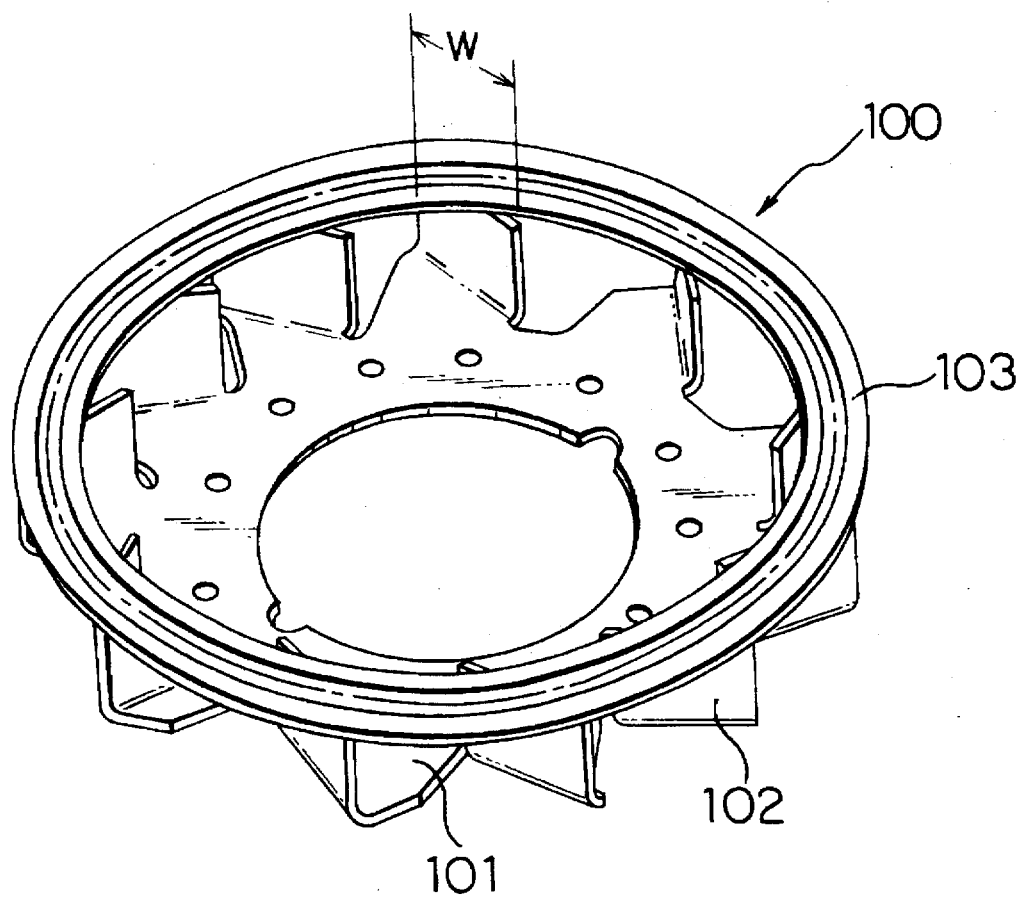
FIG. 9 is a perspective view showing a structure of a conventional cooling fan for an AC generator.
Figure 10:
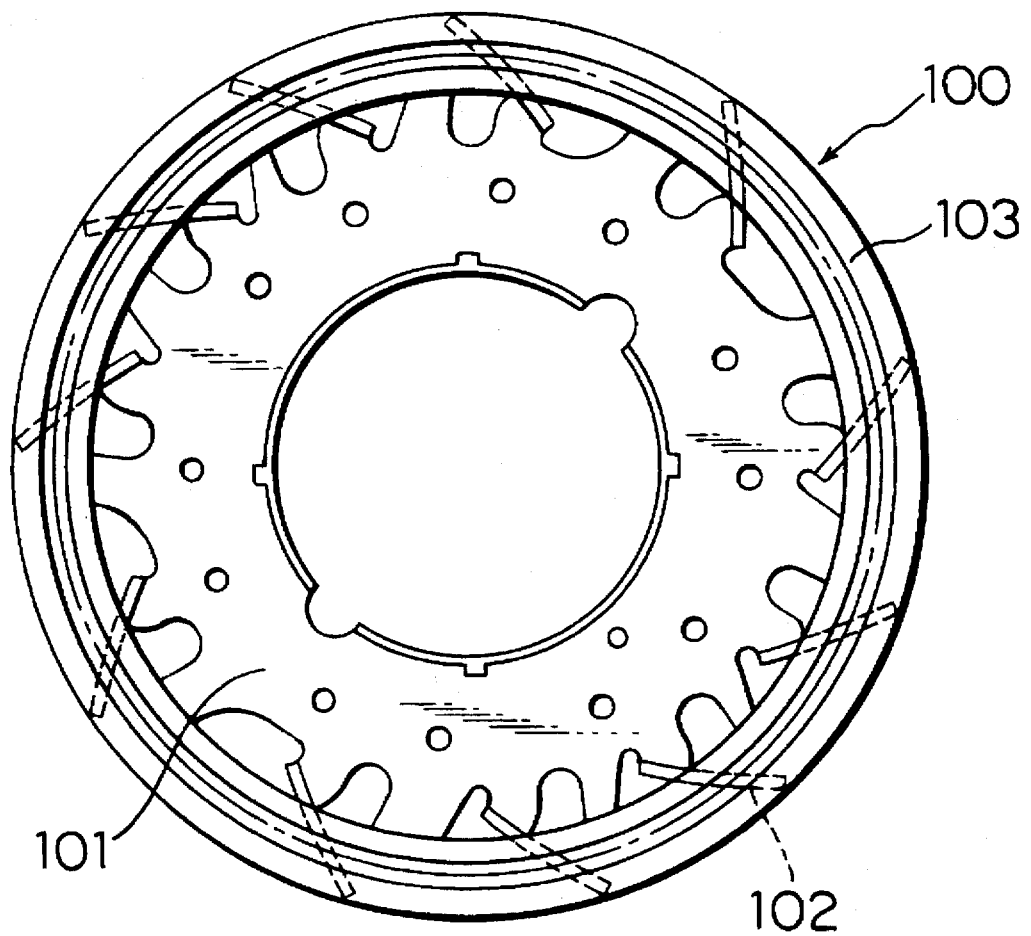
FIG. 10 is a top plan view of the same.

FIG. 7 is a top plan view of a cooling fan for an AC generator according to the third embodiment of the invention, and FIG. 8 is an exploded perspective view of the same.

The instant embodiment differs from the first and second embodiments in that the blade members and the fan guide member are formed integrally with each other.

The cooling fan 30 according to the instant embodiment is composed of a base plate 21 and a fan guide member 38 which is provided integrally with blade members 25.

Referring to FIG. 8, there are formed the supporting portions 21b in pairs at both sides of the core member 24 of the base plate 21. The core member 24 is provided with a pair of resilient legs 24b each having the chamfered bent portion 24a and the claws 24c. Besides, each of the blade members 25 has the through-hole 26 which is formed with a chamfered portion at the bottom end and the retaining notches 26b at the top end portion (see FIG. 6).

A fan guide member 38 of a synthetic resin material is integrally formed with the plurality of the blade members 25.

The cooling fan 30 having the blade members 25 and the fan guide 38 both of which are made of a synthetic resin integrally with each other can be implemented in lesser weight when compared with the cooling fan 10 according to the first embodiment of the invention in which the metallic fan guide 18 is employed. Besides, the processes for positioning the fan guide member and the blade members and securing the fan guide member to the core members can be spared, whereby the manufacturing cost can correspondingly be reduced.

In other respects, the cooling fan according to the instant embodiment is essentially same as the first and second embodiments. Accordingly, any further description will be unnecessary.

In the case of the cooling fans described in the foregoing, it has been assumed that the blade members 15 and 25 are provided on the base plate 21 in a circular array with equi-distance between the adjacent fan blades. It should however be appreciated that they may be disposed with different angular distances. Besides, the dimension W of the individual blade members may be made different from one to another to thereby disperse spectra of the noises as produced such that the noise can be suppressed more positively.

Many modifications and variations of the present invention are possible in the light of the above techniques. It is therefore to be understood that within the scope of the appended claims, the invention may be practiced otherwise than as specifically described.

We claim:

1. A cooling fan for an AC generator, comprising:

a base plate mounted on a rotatable shaft of an AC generator so as to rotate together with said shaft;

a plurality of fan blades provided along an outer periphery of said base plate and projecting therefrom, each of said fan blades having a streamline shape in cross section and each of said fan blades including a blade member; and elongated core members formed along an outer periphery of said base plate at positions where said blade members are to be mounted, said core members and said base plate constituting a monolithic construction, with said core members projecting substantially orthogonolly from said base plate;

wherein each of said blade members has a through-hole formed longitudinally, said blade member being fixedly mounted on said core member by inserting said core member into said through-hole to thereby realize said fan blade.

2. A cooling fan for an AC generator according to claim 1, wherein each of said blade members is formed of a synthetic resin material.

3. A cooling fan for an AC generator according to claim 2, further comprising:

a first engaging portion formed at one end surface of each of said plural blade members; and a second engaging portion formed in a guide member provided separately from said blade members, said second engaging portion being engageable with said first engaging portions for positioning said guide member relative to said blade members;

wherein said second engaging portion is brought into engagement with said first engaging portions to thereby fixedly secure said guide member to said core members projecting from said base plate.

4. A cooling fan structure for an AC generator according to claim 3, wherein said guide member is formed of a synthetic resin material integrally with said blade members, said blade members formed integrally with said guide member being fixedly secured by inserting said core members into said through-holes, respectively.

5. An AC generator for a motor vehicle, comprising:

an input shaft adapted to be operatively coupled to an output shaft of an internal combustion engine, and a cooling fan assembly mounted within said AC generator for carrying away heat generated therein by producing air flow circulated through said AC generator;

said cooling fan assembly comprising:

a base plate mounted on a rotatable shaft of an AC generator so as to rotate together with said shaft; and a plurality of fan blades formed along an outer periphery of said base plate and projecting therefrom, each of said fan blades including a core member constituting a monolothic construction with said base plate and projecting substantially orthogonolly therefrom and a blade member fixedly mounted on said core member and formed of a synthetic resin material and said blade member having a streamline shape in cross section.

* * * * *